US008124785B2

(12) United States Patent
Torimoto et al.

(10) Patent No.: US 8,124,785 B2
(45) Date of Patent: Feb. 28, 2012

(54) METHOD FOR PRODUCING NANOPARTICLES

(75) Inventors: Tsukasa Torimoto, Nagoya (JP); Ken-ichi Okazaki, Nagoya (JP); Nobuo Tanaka, Nagoya (JP); Susumu Kuwabata, Ibaraki (JP)

(73) Assignees: National University Corporation Nagoya University, Nagoya-shi (JP); Osaka University, Suita-shi (JP)

( * ) Notice: Subject to any disclaimer, the term of this patent is extended or adjusted under 35 U.S.C. 154(b) by 300 days.

(21) Appl. No.: 12/224,229

(22) PCT Filed: Feb. 22, 2007

(86) PCT No.: PCT/JP2007/053269
§ 371 (c)(1),
(2), (4) Date: Jul. 27, 2009

(87) PCT Pub. No.: WO2007/105443
PCT Pub. Date: Sep. 20, 2007

(65) Prior Publication Data
US 2009/0306394 A1    Dec. 10, 2009

(30) Foreign Application Priority Data
Feb. 27, 2006    (JP) .................................. 2006-050942

(51) Int. Cl.
*C07D 233/00* (2006.01)
(52) U.S. Cl. ...................... 548/335.1; 977/788; 977/810
(58) Field of Classification Search .......................... None
See application file for complete search history.

(56) References Cited

U.S. PATENT DOCUMENTS

| 2005/0088779 | A1 | 4/2005 | Gomyo et al. |
| 2005/0266238 | A1 | 12/2005 | Amano et al. |

FOREIGN PATENT DOCUMENTS

| JP | A-09-256140 | 9/1997 |
| JP | A-2003-245540 | 9/2003 |
| JP | A-2005-147394 | 6/2005 |
| JP | A-2005-281781 | 10/2005 |
| JP | A-2006-019070 | 1/2006 |
| JP | A-2006-052379 | 2/2006 |
| WO | WO 2006/132308 A1 | 12/2006 |

OTHER PUBLICATIONS

Anderson. Analytical Chemistry, 2003, 75, 4851-58.*
Itoh. Journal of the American Chemical Society, 2004, 126, 3026-3027.*
Scheeren. Journal of Physical Chemistry B, 2006, 110, 13011-13020.*
Xue. Fuel Cells, 2006, 5, 347-355.*
Fonseca. Journal of Colloid and Interface Science, 2006, 301, 193-204.*
Li. Journal of Physical Chemistry B, 2005, 109, 14445-14448.*
Miao. Angewandte Chemie International Edition, 2006, 45, 266-269.*
Mu. Catalysis Letters, 2004, 97 (3-4), 151-154.*
Deutsch. Carbon, 2004, 1137-1141.*
Japan Nanonet Bulletin, "Fabrication of Fine Structure Using Magnetic Metal—From production of nanoparticles to nano-plasma processing-," Nanotechnology Support Project Center in Ministry of Education, Culture, Sports, Science, and Technology, No. 8, Dec. 2005, pp. 13-14 (with Partial Translation).
Feng et al., "Growth behavior and surface morphology of Ag rough thin films deposited on silicone oil surfaces," *Thin Solid Films*, vol. 342, 1999, pp. 30-34.
Ye et al., "Structural and electrical properties of a metallic rough-thin-film system deposited on liquid substrates," *Physical Review*, vol. 54, No. 20, Nov. 15, 1996, pp. 14754-14757.

* cited by examiner

*Primary Examiner* — Noble Jarrell
(74) *Attorney, Agent, or Firm* — Oliff & Berridge, PLC

(57) ABSTRACT

The present invention provides a method for producing nanoparticles by attaching atoms or molecules constituting a nanoparticle precursor to an ionic liquid. According to this method, it is possible to produce nanoparticles that do not aggregate easily in a liquid without its surface modification. Furthermore, it is possible to produce nanoparticles without the need for a complicated operation or the formation of a by-product because of the direct production of the nanoparticles from the nanoparticle precursor.

11 Claims, 7 Drawing Sheets

METHOD FOR PRODUCING NANOPARTICLES

TECHNICAL FIELD

The present invention relates to a method for producing nanoparticles.

BACKGROUND ART

Known examples of a method for producing nanoparticles in the related art include wet processes in which nanoparticles are produced in solutions using chemical reactions and dry processes in which nanoparticles are directly deposited on substrates using vacuum technology. An example of the wet processes is described in Patent Document 1 which discloses a process for producing copper nanoparticles in a mixed solvent containing an ether solvent and a cyclic ether solvent by adding a copper compound, a stabilizer, and a reducing agent to the mixed solvent and heating the resulting mixture under non-acidic conditions. An example of the dry processes is described in Patent Document 2 which discloses a process for producing gold nanoparticles by vacuum evaporation on a substrate composed of highly-oriented pyrolytic graphite (HOPG) or $SiO_2$. Furthermore, as another vacuum evaporation process, Non-Patent Document 1 discloses a process for producing metal nanoparticles by heating oil in which a surfactant is dissolved and a metal arranged above the surface of the oil and enclosing evaporated fine metal particles with the surfactant.

Patent Document 1: JP 2005-281781 A
Patent Document 2: JP 9-256140 A
Non-Patent Document 1: Japan Nanonet Bulletin, No. 08, Nanotechnology Support Project Center in Ministry of Education, Culture, Sports, Science and Technology, Dec.2005, pp. 13-14

DISCLOSURE OF INVENTION

Unfortunately, the wet and dry processes in the related art have problems described below. In the wet processes, although nanoparticles having relatively uniform sizes can be mass-produced, the resulting nanoparticles aggregate easily in a solution. To achieve satisfactory dispersion stability in the solution, thus, the particles should be chemically modified by a stabilizer such as a surfactant. The resulting nanoparticles, therefore, are not suitable for applications such as highly active catalysts having active sites on their particle surface. Furthermore, the reaction solution contains salts as by-products and/or decomposition products; hence, complicated operations to remove them are required. On the other hand, in the dry processes, the resulting nanoparticles are not chemically modified, and thus pure nanoparticles can be produced in a relatively simple system. However, the resulting nanoparticles have a broad particle size distribution, and it is thus difficult to provide nanoparticles having a uniform particle size. Furthermore, the dry processes provide the small amounts of products formed compared with the amounts of raw materials used, thus leading to high production costs. Moreover, the resulting nanoparticles are fixed on the substrate; hence, it is difficult to collect the nanoparticles as a powder. In that respect, in the production process described in Non-Patent Document 1, the resulting nanoparticles are not fixed on a substrate and thus are easily collected as a powder. However, the nanoparticles are covered with the surfactant; hence, the process is not suitable for applications that use particle surfaces as active sites, as in the wet process. Therefore, it has been demanded to develop a novel production process superior to the wet and dry processes in the related art from the viewpoint of achieving good properties and productivity of nanoparticles formed.

The present invention has been accomplished to satisfy the demand. It is an object of the present invention to provide a novel method for producing nanoparticles.

To create a novel method for producing nanoparticles, the inventors have their attention on unique properties of an ionic liquid and have attached atoms or molecules constituting a nanoparticle precursor to the ionic liquid. Thus, the inventors have found an excellent method for producing nanoparticles from the viewpoint of achieving good properties and productivity of nanoparticles formed. This finding has led to the completion of the present invention.

That is, a method for producing nanoparticles of the present invention includes attaching atoms or molecules constituting a nanoparticle precursor to an ionic liquid.

According to the method for producing nanoparticles, it is possible to produce nanoparticles that do not aggregate easily in a liquid without its surface modification by attaching the atoms or molecules constituting the nanoparticle precursor to the ionic liquid. Furthermore, it is possible to produce nanoparticles without the need for a complicated operation or the formation of a by-product because of the direct production of the nanoparticles from the nanoparticle precursor.

BEST MODES FOR CARRYING OUT THE INVENTION

Figure 1:
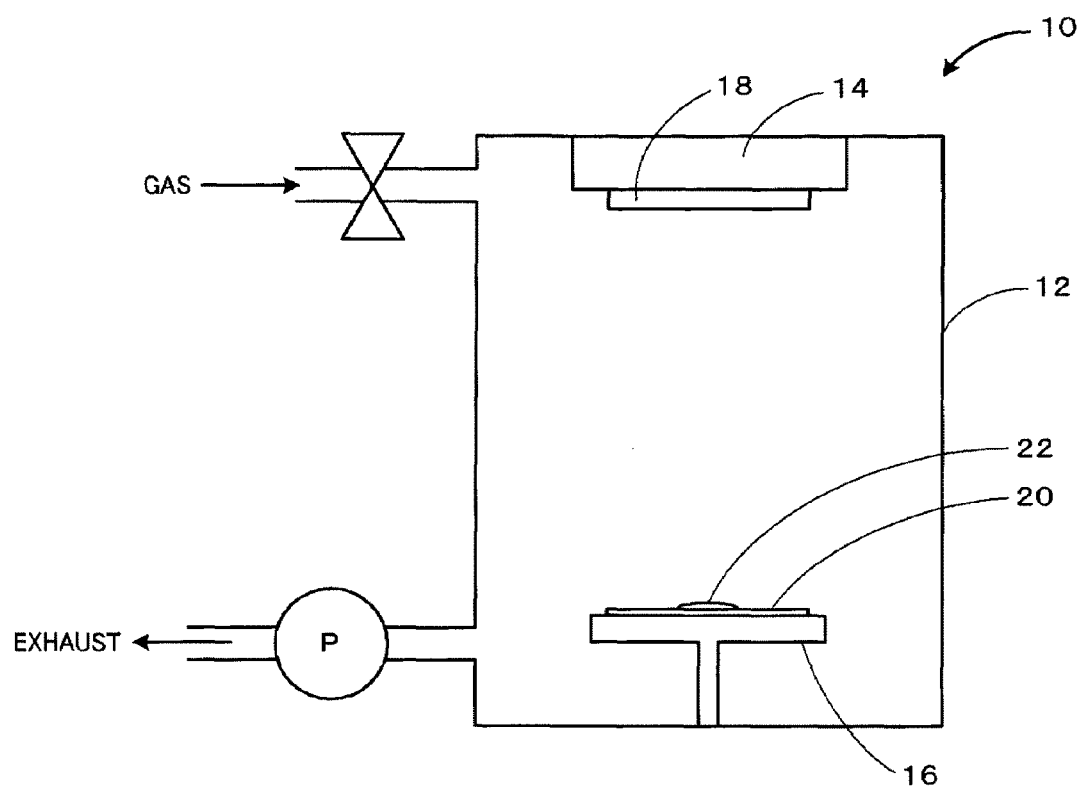
FIG. 1 is an illustrative schematic diagram of an evaporator 10.

In a method for producing nanoparticles of the present invention, atoms or molecules constituting a nanoparticle precursor are attached to an ionic liquid to produce the nanoparticles.

The nanoparticle precursor may be a pure substance or a mixture. The pure substance may be a simple substance or a compound. The nanoparticle precursor may be a gas, liquid, or solid but is preferably a solid. The type of nanoparticle precursor is not particularly limited but is preferably a metal or a semiconductor. Examples of the metal include gold, silver, copper, platinum, palladium, nickel, indium, aluminum, iron, rhodium, ruthenium, osmium, cobalt, molybdenum, zinc, vanadium, tungsten, titanium, manganese, and chromium. Gold or silver is more preferred. Examples of the semiconductor include ZnS, CdS, CdSe, $In_2O_3$, $SiO_2$, $SnO_2$, $TaO_5$, $TiO_2$, $BaTiO_3$, Si, Se, Te, $InAgS_2$, and $InCuS_2$.

Ionic liquids are compounds that are in the form of a liquid at ambient temperature even though the compounds consist only of cations and anions. Ionic liquids have properties such as high-temperature stability, wide temperature ranges in which ionic liquids are in the form of a liquid, a vapor pressure of about zero, low viscosity yet ionicity, high resistance to oxidation and reduction, and the like. An ionic liquid that can be applied to the present invention may be hydrophilic or hydrophobic. The type of ionic liquid is not particularly limited. Examples thereof include aliphatic ionic liquids, imidazolium ionic liquids, and pyridinium ionic liquids. Examples of aliphatic ionic liquids include N,N,N-trimethyl-N-propylammonium bis(trifluoromethanesulfonyl)imide (hereinafter, referred to as "TMPA-TFSI"), N-methyl-N-propylpiperidinium bis(trifluoromethanesulfonyl)imide, N,N-diethyl-N-methyl-N-(2-methoxyethyl)ammonium bis(trifluoromethanesulfonyl)imide, and N,N-diethyl-N-methyl-N-(2-methoxyethyl)ammonium tetrafluoroborate. The TMPA-TFSI is preferred. Examples of imidazolium ionic liquids include 1,3-dialkylimidazolium salts and 1,2,3-trialkylimidazolium salts. Specific examples of 1,3-dialkylimidazolium salts include 1-ethyl-3-methylimidazolium bromide, 1-ethyl-3-methylimidazolium chloride, 1-ethyl-3-methylimidazolium (L)-lactate, 1-ethyl-3-methylimidazolium hexafluorophosphate, 1-ethyl-3-methylidazolium tetrafluoroborate (hereinafter, referred to as "EMI-BF4"), 1-butyl-3-methylidazolium chloride, 1-butyl-3-methylidazolium hexafluorophosphate, 1-butyl-3-methylidazolium tetrafluoroborate (hereinafter, referred to as "BMI-BF4), 1-butyl-3-methylidazolium trifluoromethanesulfonate, 1-butyl-3-methylimidazolium (L)-lactate, 1-hexyl-3-methylimidazolium bromide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium trifluoromethanesulfonate, 1-octyl-3-methylimidazolium chloride, 1-octyl-3-methylimidazolium hexafluorophosphate, 1-decyl-3-methylimidazolium chloride, 1-dodecyl-3-methylimidazolium chloride, 1-tetradecyl-3-methylimidazolium chloride, 1-hexadecyl-3-methylimidazolium chloride, and 1-octadecyl-3-methylimidazolium chloride. Examples of 1,2,3-trialkylimidazolium salts include 1-ethyl-2,3-dimethylimidazolium bromide, 1-ethyl-2,3-dimethylimidazolium chloride, 1-butyl-2,3-dimethylimidazolium bromide, 1-butyl-2-dimethylimidazolium chloride, 1-butyl-2,3-dimethylimidazolium tetrafluoroborate, 1-butyl-2,3-dimethylimidazolium trifluoromethanesulfonate, 1-hexyl-2,3-dimethylimidazolium bromide, 1-hexyl-2,3-dimethylimidazolium chloride, 1-hexyl-2,3-dimethylimidazolium tetrafluoroborate, and 1-hexyl-2,3-dimethylimidazolium trifluoromethanesulfonate. The EMI-BF4 or BMI-BF4 is preferred. Examples of pyridinium ionic liquids include ethylpyridinium salts, butylpyridinium salts, and hexylpyridinium salts. Specific examples of ethylpyridinium salts include 1-ethylpyridinium bromide and 1-ethylpyridinium chloride. Examples of butylpyridinium salts include 1-butylpyridinium bromide, 1-butylpyridinium chloride, 1-butylpyridinium hexafluorophosphate, 1-butylpyridinium tetrafluoroborate, and 1-butylpyridinium trifluoromethanesulfonate. Examples of hexylpyridinium salts include 1-hexylpyridinium bromide, 1-hexylpyridinium chloride, 1-hexylpyridinium hexafluorophosphate, 1-hexylpyridinium tetrafluoroborate, and 1-hexylpyridinium trifluoromethanesulfonate.

Among these ionic liquids, for example, the EMI-BF4 and BMI-BF4, which are imidazolium compounds having high hydrophilicity, may be used in the present invention. Furthermore, the TMPA-TFSI, which is an aliphatic compound having high hydrophobicity, may be used in the present invention.

A method for producing nanoparticles of the present invention can be performed with the same apparatus and by the same procedure as in the case of the deposition of nanoparticles on a substrate by a known dry process for film formation, for example, a chemical vapor deposition process (CVD process) or a physical vapor deposition process (PVD process). Preferably, a physical vapor deposition process (e.g., vacuum evaporation, ion plating, sputtering) in which atoms or molecules constituting a nanoparticle precursor are evaporated from the nanoparticle precursor being in the form of a solid is employed. In accordance with such a physical vapor deposition process, nanoparticles can be directly produced from a bulk material in a relatively simple system. Sputtering, which is one of the physical vapor deposition processes, is more preferred. Sputtering does not require a crucible used for evaporation of the nanoparticle precursor, thus resulting in high-purity nanoparticles. With respect to the principle of evaporation, in the case of vacuum evaporation, for example, resistance heating, far-infrared heating, electron-beam heating, arc heating, or high-frequency induction heating may be employed. In the case of ion plating, for example, high-frequency excitation, an ion beam method, or a cluster method may be employed. In the case of sputtering, for example, DC sputtering, magnetron sputtering, high-frequency sputtering, or ion-beam sputtering may be employed.

In the method for producing nanoparticles of the present invention, the atoms or molecules constituting the nanoparticle precursor are preferably attached to the ionic liquid under reduced pressure. At a reduced pressure, high-purity nanoparticles can be formed in a short time. The term "under reduced pressure" indicates that the pressure is lower than atmospheric pressure. Preferably, the pressure is 20 Pa or less.

In the case where nanoparticles are produced by sputtering, sputtering may be performed in a gas atmosphere. In the case where a gas is fed, the gas used is preferably a rare gas and more preferably argon gas. In this case, the pressure of the argon gas is preferably 20 Pa or less. The evaporation current may be appropriately set in response to a material and an evaporator. The preferred range of the reaction time varies depending on the reaction temperature, the amount of ionic liquid, and the like. The reaction time is preferably set in the range of several tens of seconds to several hours and more preferably 30 seconds to 20 minutes.

In the case where nanoparticles are produced by sputtering, for example, the following process may be employed. As shown in FIG. 1, an evaporator 10 including an evaporation chamber 12 that can be evacuated, a negative electrode 14 arranged on an upper face of the evaporation chamber 12 and on which a target material 18 can be mounted, and a positive electrode 16 facing the negative electrode 14 is prepared. The target material 18 (nanoparticle precursor in the present invention) is mounted on the negative electrode 14, and a glass substrate 20 on which an ionic liquid 22 is placed is arranged on the positive electrode 16. A high voltage is applied to the negative electrode 14 while the evaporation chamber 12 is evacuated to vacuum or is filled with a gas atmosphere (e.g., argon gas), thereby producing a glow discharge in the evaporation chamber 12. Gas ions formed by the glow discharge collide with the target material 18 to evaporate atoms or molecules constituting the target material 18 by sputtering. The atoms or molecules sputtered from the target material 18 get attached to the facing ionic liquid 22 to form nanoparticles composed of the same atoms or molecules as the atoms or molecules constituting the target material 18 on or in the ionic liquid 22. The resulting nanoparticles have high purity and surfaces being not chemically modified. Furthermore, no by-product is formed.

According to the method for producing nanoparticles of the present invention, the particle sizes of the resulting nanoparticles vary depending on the type of ionic liquid used. Specifically, to produce nanoparticles having a particle size distribution of 3.0 to 8.0 nm, an imidazolium compound with high hydrophilicity is preferably used as the ionic liquid. In this case, the EMI-BF4 is more preferably used as the imidazolium compound with high hydrophilicity. To produce nanoparticles having a particle size distribution of 1.0 to 4.0 nm, an aliphatic compound with high hydrophobicity is preferably used as the ionic liquid. In this case, the TMPA-TFSI is more preferably used as the aliphatic compound with high hydrophobicity. The method for producing nanoparticles of the present invention provides nanoparticles having an average particle size of 1.5 to 6.0 nm. Nanoparticles having a particle size of 10 nm or less exhibit physicochemical properties different from bulk materials due to the quantum size effect. Thus, the nanoparticles obtained by the method for producing nanoparticles of the present invention should be used in various technical fields such as highly active photocatalyst materials, optoelectronic elements, and biomolecular markers. Furthermore, according to the method for producing nanoparticles of the present invention, the particle sizes of the resulting nanoparticles vary depending on the reaction time. Specifically, the particle sizes of the nanoparticles tend to increase with increasing reaction time. When the particle sizes of the nanoparticles reach a predetermined value, the particle growth tends to be terminated. Thus, the nanoparticles having desired particle sizes can be produced by changing the reaction time.

In the method for producing nanoparticles of the present invention, nanoparticles composed of two or more different elements may be produced by using two or more nanoparticle precursors composed of different elements in place of the foregoing nanoparticle precursor and attaching atoms or molecules constituting the two or more nanoparticle precursors to the ionic liquid. In this case, the nanoparticles composed of the two or more elements can be produced in a relatively simple system. For example, in the case where sputtering is performed with a target material in which gold plates and silver plates are alternately arranged, nanoparticles composed of a gold-silver alloy are formed.

In the method for producing nanoparticles of the present invention, nanoparticles composed of two or more different elements may be produced by adding a reactant to the ionic liquid, the reactant being composed of an element different from the atoms or molecules constituting the nanoparticle precursor and being capable of chemically reacting with the atoms or molecules constituting the nanoparticle precursor, and attaching the atoms or molecules constituting the nanoparticle precursor to the ionic liquid. Also in this case, the nanoparticles composed of the two or more elements can be produced in a relatively simple system. Examples of "the chemical reaction" defined here include decomposition reactions and redox reactions. Examples of "the reactant capable of chemically reacting with the atoms or molecules constituting the nanoparticle precursor" include reactants containing elements more easily reduced than the atoms or molecules constituting the nanoparticle precursor. Specifically, in the case where the nanoparticle precursor is silver, chlorauric acid serves as the reactant. In this case, nanoparticles composed of a gold-silver alloy are formed.

The nanoparticles produced by the method for producing nanoparticles of the present invention can be recovered from the ionic liquid by adding a solvent having a high affinity for the ionic liquid to the ionic liquid. That is, the addition of the solvent having a high affinity for the ionic liquid to the ionic liquid results in the precipitation of the nanoparticles in the ionic liquid. In this way, it is possible to recover the nanoparticles from the ionic liquid without the need for a complicated operation. With respect to the solvent having a high affinity for the ionic liquid, in the case of using a hydrophilic ion liquid as the ionic liquid, examples of the solvent include water, methanol, ethanol, and acetone. In the case of using a hydrophobic ion liquid, examples of the solvent include ether, heptane, chloroform, and methylene chloride.

Best modes for carrying out the invention will be specifically described below by examples.

EXAMPLE 1

(1) Production of Gold Nanoparticles with EMI-BF4

On a slide glass (26 mm×76 mm), 0.60 cm$^3$ of 1-ethyl-3-methylimidazolium tetrafluoroborate (EMI-BF4) was evenly placed. At this time, the EMI-BF4 was not spilled from the glass substrate because of its surface tension. This was placed in an evaporator (SIB-3, manufactured by Eiko Engineering Co., Ltd.). A target material composed of gold (a disk with a diameter of 50 mm and a thickness of 0.1 mm) was arranged at a position facing the EMI-BF4, and sputtering was performed with the gold target (evaporation chamber: filled with air, pressure: 20 Pa, evaporation current: about 5 mA, reaction time: 15 minutes). After the sputtering, the resulting EMI-EF4 solution on the surface of the slide glass was recovered.

(2) Measurement of Absorption Spectrum

Figure 2:
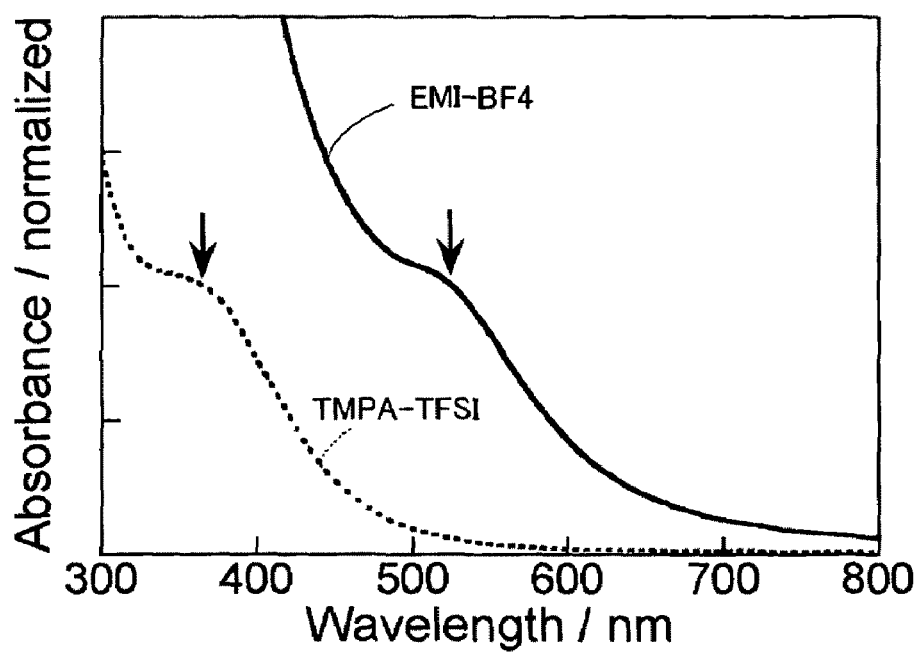
FIG. 2 is a graph illustrating the absorption spectra of ionic liquids after the sputter deposition of gold.

FIG. 2 illustrates the absorption spectra of the ionic liquid solutions after the sputtering. In FIG. 2, a solid line indicates the absorption spectrum of the EMI-BF4 solution, and a dotted line indicates the absorption spectrum of a TMPA-TFSI solution described below. The results demonstrated that in the case of using the EMI-BF4 as the ionic liquid, an absorption peak resulting from the surface plasmon absorption of gold nanoparticles was observed at about 520 nm and thus that gold nanoparticles were formed in the EMI-BF4.

(3) TEM Observation

Figure 3:
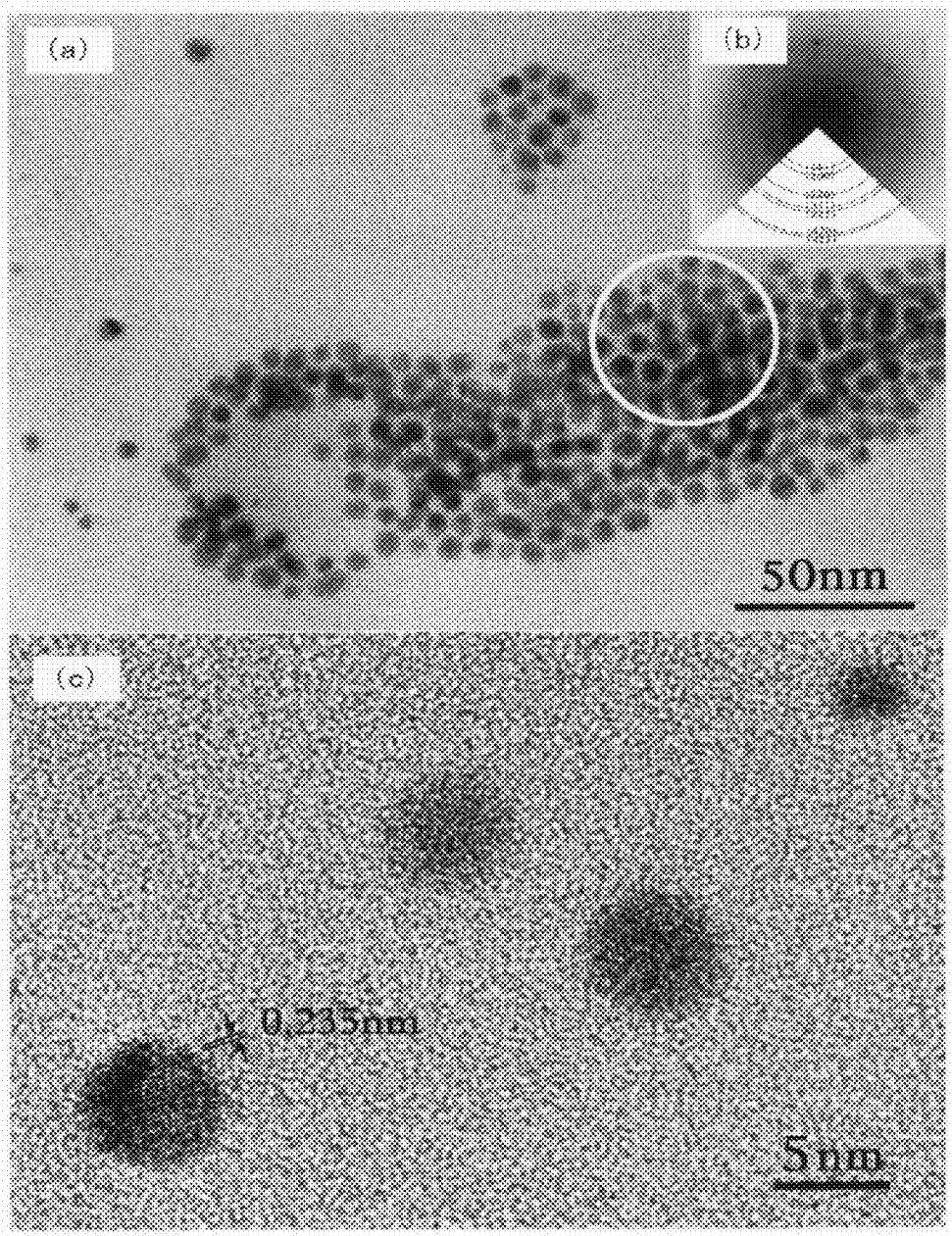
FIG. 3 shows photographs illustrating TEM images of gold nanoparticles formed in EMI-BF4.
Figure 4:
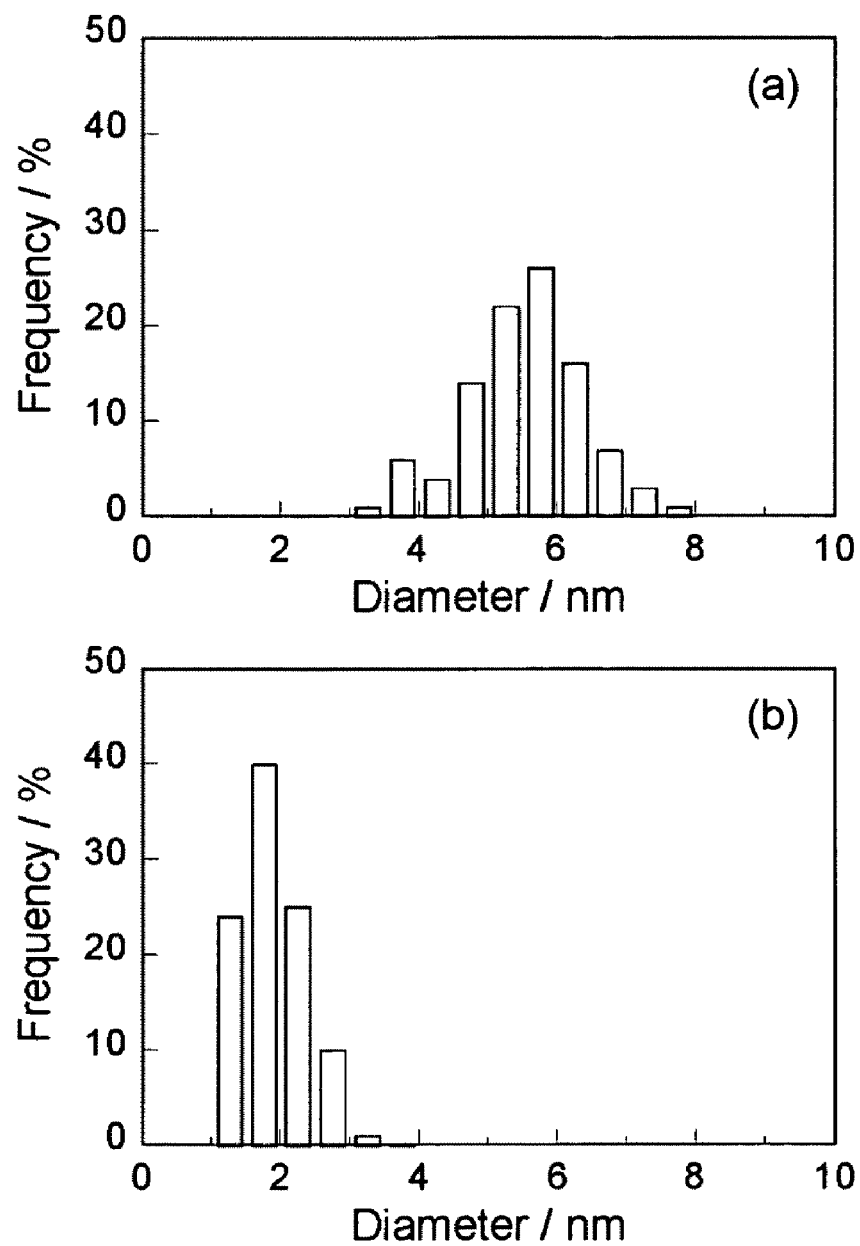
FIG. 4 shows graphs illustrating particle size distributions of gold nanoparticles.

After the sputtering, the EMI-BF4 solution was observed with a transmission electron microscope (TEM, Model JEM-2010F, manufactured by JEOL Ltd). FIG. 3 shows the observation results. FIG. 3(*b*) shows an electron diffraction pattern of a region surrounded by a white line shown in FIG. 3(*a*). FIG. 3(*c*) shows the result of high-resolution observation. A commercially available carbon-coated microgrid (type B, from Okenshoji Co., Ltd.) was used as a TEM grid. A test sample was prepared by dropping the EMI-BF4 after the sputtering onto the TEM grid. TEM observation of the sample showed that relatively monodispersed spherical nanoparticles were formed in the EMI-BF4. That is, this result demonstrates that the gold nanoparticles do not easily aggregate in the EMI-BF4 without surface modification. The electron diffraction pattern (refer to FIG. 3(*b*)) demonstrated that the crystal structure of the gold nanoparticles was the fcc structure the same as the bulk crystal. The high-resolution TEM image (refer to FIG. 3(*c*)) demonstrated that the gold particles showing clear lattice fringes assigned to the Au(111) surface (lattice spacing: 0.235 nm) were observed and individual particles have high crystallinity. FIG. 4(*a*) shows the particle size distribution of the spherical particles from the TEM image. As shown in FIG. 4(*a*), the results demonstrated that the particles had a particle size distribution of 3.0 to 8.0 nm, an average particle size of 5.5 nm, and a standard deviation of 0.86 nm.

EXAMPLE 2

(1) Production of Gold Nanoparticles with TMPA-TFSI

Gold nanoparticles were synthesized as in Example 1, except that N,N,N-trimethyl-N-propylammonium bis(trifluoromethanesulfonyl)imide (TMPA-TFSI) was used as the ionic liquid. After sputtering, the resulting ionic liquid solution on the surface of the slide glass was recovered.

(2) Measurement of Absorption Spectrum

The absorption spectrum of the TMPA-TFSI solution after the sputtering is represented by the dotted line in FIG. 2. In the case of using the TMPA-TFSI as the ionic liquid, the surface plasmon absorption peak of the resulting gold nanoparticles was not observed. An absorption spectrum in which an absorption edge was observed at about 600 nm and the shoulder of the absorption curve was observed at about 350 nm was obtained. It has been reported that for gold nanoparticles having a particle size of about 10 nm or less, a decrease in particle size results in a decrease in surface plasmon peak intensity and a broad peak shape (J. Phys. Chem. B 101(1997) 3706 and J. Chem. Phys. 112(2000)5942). Furthermore, gold nanoparticles having a particle size of about 2 nm or less are known to have an absorption peak of 300 to 450 nm (J. Am. Chem. Soc, 125(2005)4046 and J. Phys. Chem. B 106(2002) 9979). Thus, the results shown in FIG. 2 suggest that the gold nanoparticles formed in the TMPA-TFSI had particle sizes smaller than those in the EMI-BF4.

(3) TEM Observation

Figure 5:
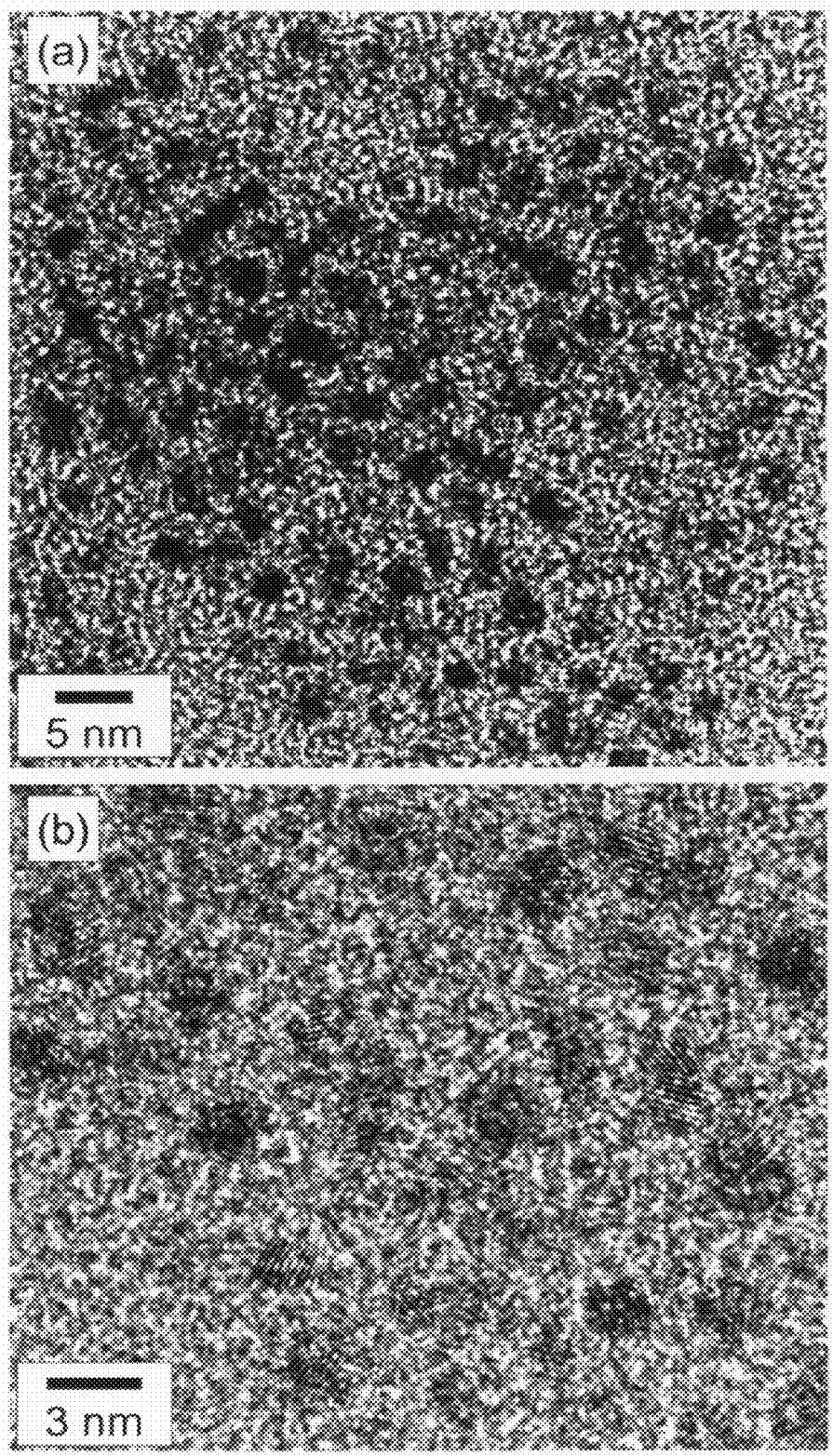
FIG. 5 shows photographs illustrating TEM images of gold nanoparticles formed in TMPA-TFSI.

FIG. 5 shows the observation results of the TMPA-TFSI solution after the sputtering with a transmission electron microscope (TEM, Model JEM-2010F, manufactured by JEOL Ltd). FIG. 5(b) shows the result of the high-resolution observation of a region shown in FIG. 5(a). A commercially available carbon-coated microgrid (type B, from Okenshoji Co., Ltd.) was used as a TEM grid. A test sample was prepared by dropping the TMPA-TFSI after the sputtering onto the TEM grid. TEM observation of the sample showed that monodispersed spherical nanoparticles were formed in the TMPA-TFSI. That is, this result demonstrates that the gold nanoparticles do not easily aggregate in the TMPA-TFSI without surface modification. In the high-resolution image, the gold particles having the fcc structure and showing clear lattice fringes assigned to the Au(111) surface (lattice spacing: 0.235 nm) were observed. FIG. 4(b) shows the particle size distribution of the spherical particles from the TEM image. As shown in FIG. 4(b), the results demonstrated that the particles had a particle size distribution of 1.0 to 4.0 nm, an average particle size of 1.9 nm, and a standard deviation of 0.46 nm.

(4) Comparison with EMI-BF4

The use of the TMPA-TFSI as the ionic liquid resulted in smaller and more monodispersed gold nanoparticles than those in the case of using the EMI-BF4. These results demonstrated that the particle sizes of the resulting gold nanoparticles varied depending on the type of ionic liquid used.

EXAMPLE 3

(1) Production of Gold Nanoparticles

On a slide glass (26 mm×38 mm), 0.60 cm$^3$ of EMI-BF4 was evenly placed. This was placed in an evaporator (JFC-1300, manufactured by JEOL Ltd). A target material composed of gold (a disk with a diameter of 57 mm and a thickness of 0.5 mm) was arranged at a position facing the EMI-BF4, and sputtering was performed with the gold target (evaporation chamber: filled with argon, pressure: 8 Pa, evaporation current: about 40 mA). The sputtering was performed for a reaction time of 0.5 minutes, 1 minute, 2 minutes, or 10 minutes. After the sputtering, the resulting EMI-BF4 solution on the surface of the slide glass was recovered.

(2) Relationship between Reaction Time and Particle Size

Figure 6:
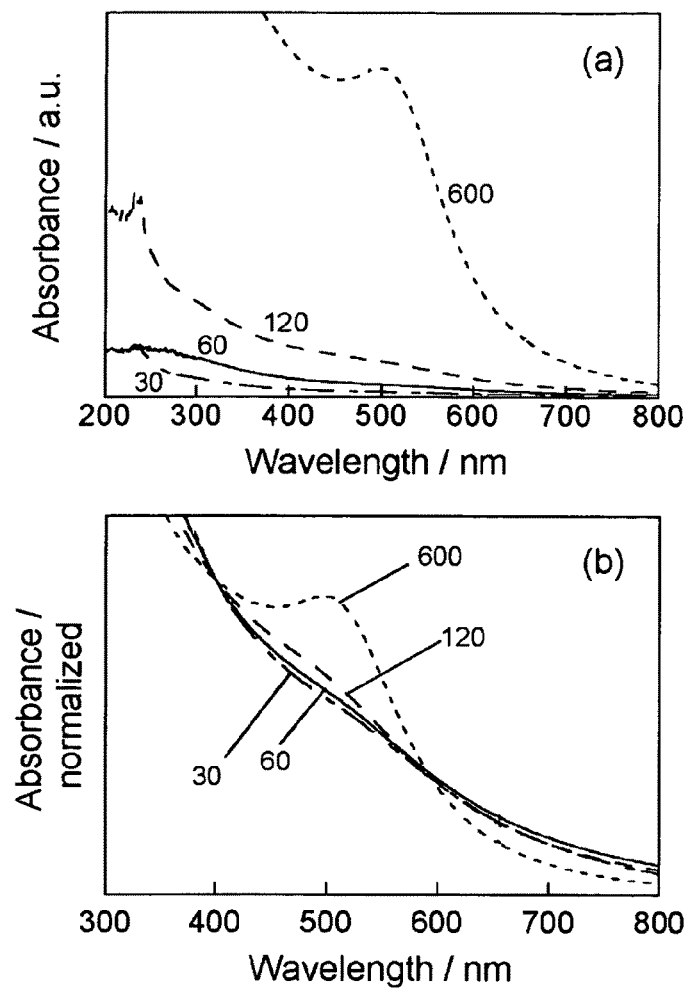
FIG. 6 shows the changes in the absorption spectra of an EMI-BF4 solution after the sputter deposition of gold at different reaction times.

FIG. 6 shows the change in the absorption spectrum of the EMI-BF4 solution after the sputtering at the different reaction times. FIG. 6(b) shows spectra normalized with respect to the absorbance at 400 nm of the spectra shown in FIG. 6(a). As shown in FIG. 6(a), at any reaction time, a broad absorption spectrum having absorption at 800 nm or less was observed, and the absorbance increased with increasing reaction time. The results demonstrated that the amount of gold nanoparticles formed in the ionic liquid tended to increase with increasing reaction time. Furthermore, as shown in FIG. 6(b), an absorption peak at 520 nm resulting from the surface plasmons increased markedly with increasing reaction time. As described above, it has been reported that for gold nanoparticles having a particle size of about 10 nm or less, a decrease in particle size results in a broad surface plasmon peak. Thus, the results demonstrated that the size of the gold particles formed varied depending on the reaction time and that a longer reaction time resulted in the formation of larger gold nanoparticles.

EXAMPLE 4

(1) Production of Alloy Nanoparticles

Figure 7:
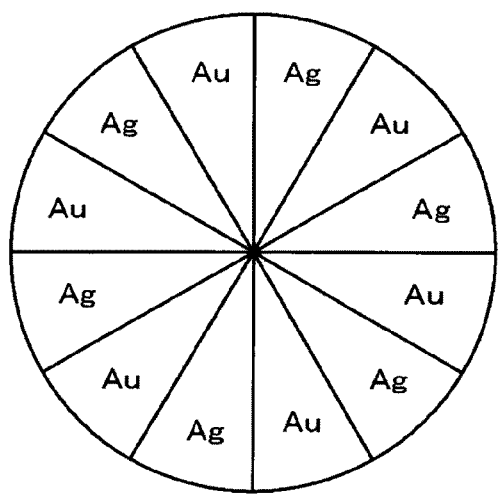
FIG. 7 is a schematic plan view illustrating a gold-silver target plate having alternately arranged gold and silver segments.

On a slide glass (26 mm×38 mm), 0.60 cm$^3$ of EMI-BF4 was evenly placed. This was placed in an evaporator (JFC-1300, manufactured by JEOL Ltd). A target material composed of gold and silver was arranged at a position facing the EMI-BF4, and sputtering was performed with the gold and silver target (evaporation chamber: filled with argon, pressure: 8 Pa, evaporation current: about 40 mA, reaction time: 2 minutes). As shown in FIG. 7, a gold-silver plate having alternately arranged gold and silver segments in which alternating gold and silver segments were arranged radially, each gold segment having the same area as each silver segment, was used as the target material (a disk with a diameter of 57 mm and a thickness of 0.5 mm). After the sputtering, the resulting EMI-BF4 solution on the surface of the slide glass was recovered.

(2) Measurement of Absorption Spectrum

Figure 8:
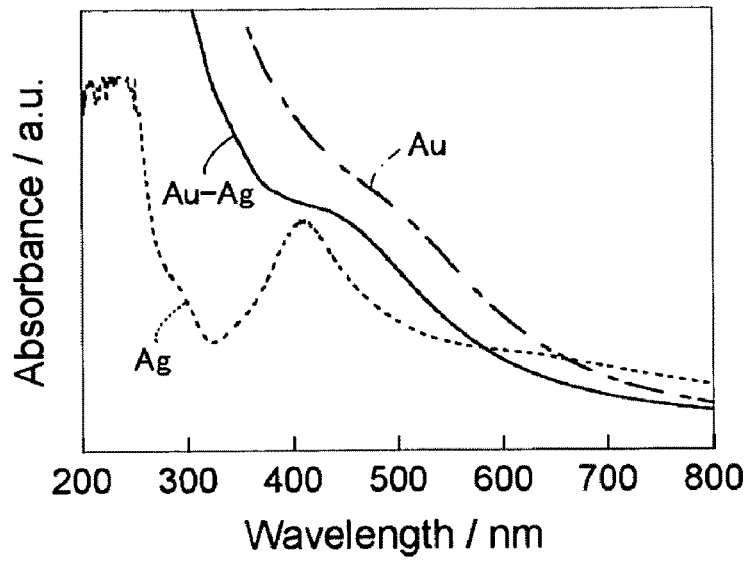
FIG. 8 is an illustrative graph showing the absorption spectra of EMI-BF4 solutions in the case of using a gold plate, a silver plate, or the gold-silver plate having alternately arranged gold and silver segments.

FIG. 8 shows the absorption spectrum of the EMI-BF4 solution after the sputtering. In the case of using the gold-silver plate (solid line) as the target material, the surface plasmon absorption peak was observed at 450 nm. In the case of using a silver plate (dotted line) as the target material, a peak assigned to the surface plasmon absorption resulting from silver nanoparticles was observed at 411 nm. In the case of using a gold plate (alternate long and short dashed lines) as the target material, a peak assigned to the surface plasmon absorption resulting from gold nanoparticles was observed at 510 nm. That is, the wavelength of 450 nm at which the peak was observed in the case of using the gold-silver plate as the target material is a value intermediate between the wavelengths of the surface plasmon absorption peaks of the gold nanoparticles and the silver nanoparticles. It has been reported that gold-silver-alloy nanoparticles exhibit clear surface plasmon absorption and that the peak wavelength varies depending on the alloy composition between wavelengths of surface plasmon absorption peaks of gold nanoparticles and silver nanoparticles (J. Colloid Interface Sci., 286(2005)602). These results demonstrated that in the case where the metal nanoparticles were produced with the gold-silver plate as the target material, the gold-silver-alloy nanoparticles were formed in the ionic liquid.

EXAMPLE 5

(1) Production of Nanoparticles using Chemical Reaction in Ionic Liquid

On a slide glass (26 mm×38 mm), 0.60 cm$^3$ of 1-butyl-3-methylimidazolium tetrafluoroborate (BMI-BF4) containing chloroauric acid (HAuCl$_4$) in an amount of 0.3 mmol/dm$^3$ was evenly placed. This was placed in an evaporator (JFC-1300, manufactured by JEOL Ltd). Sputtering was performed with a silver target (a disk with a diameter of 57 mm and a thickness of 0.5 mm) (evaporation chamber: filled with argon, pressure: 8 Pa, evaporation current: about 40 mA, reaction time: 1 minute). After the sputtering, the resulting EMI-BF4 solution on the surface of the slide glass was recovered.

(2) Measurement of Absorption Spectrum

Figure 9:
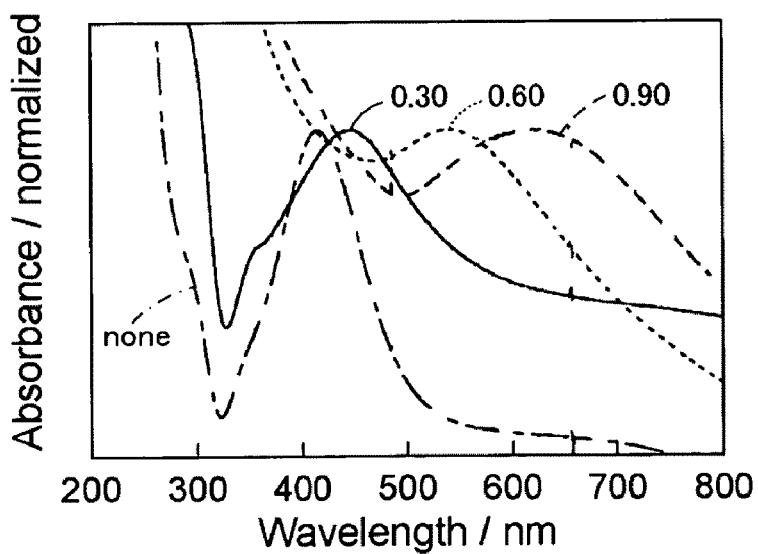
FIG. 9 is an illustrative graph showing the change in absorption spectra of EMI-BF4 solutions having various chloroauric acid contents after sputtering with silver.

FIG. 9 shows the change in the absorption spectrum of the EMI-BF4 solution after the sputtering. FIG. 9 shows absorption spectra normalized with respect to the respective surface plasmon absorption peak wavelengths. In the case of using the BMI-BF4 containing chloroauric acid (solid line), the surface plasmon absorption peak was observed at a wavelength longer than that in the case of using BMI-BF4 not containing chloroauric acid (alternate long and short dashed lines). It has been reported that chloroauric acid is reduced by silver to form gold in accordance with the formula (1) (J. Phys. Chem. B109(2005)19208). In addition, it has been reported that the surface plasmon peak of gold nanoparticles shifts to longer wavelengths as the particle size increases (>20 nm) (Chem. Mater. 13(2001)2313). Furthermore, it has been reported that the surface plasmon peak of gold nanoparticles shifts to longer wavelengths when the nanoparticles having a core-shell structure, for example, nanoparticles having a silver core-gold shell structure, are formed (J. Phys. Chem. B 109(2005)19208). Thus, the results shown in FIG. 9 suggest that chloroauric acid in the ionic liquid was reduced by silver particles formed by sputtering to form gold-silver-composite particles such as core-shell-structured particles.

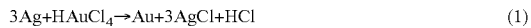

$$3Ag + HAuCl_4 \rightarrow Au + 3AgCl + HCl \quad (1)$$

EXAMPLE 6

(1) Production of Nanoparticles using Chemical Reaction in Ion Liquid

Nanoparticles were synthesized as in Example 5, except that chloroauric acid had a concentration of 0.6 mmol/dm$^3$ or 0.9 mmol/dm$^3$. After the sputtering, the resulting EMI-BF4 solution on the surface of the slide glass was recovered.

(2) Relationship Between Chloroauric Acid Concentration in Ionic Liquid and Particle Size As shown in FIG. 9, the absorption peak resulting from the surface plasmons shifted to longer wavelengths as the chloroauric acid concentration in the ionic liquid was increased. As described above, it has been reported that the surface plasmon peak of the gold nanoparticles shifts to longer wavelengths as the particle size was increased. Thus, these results suggested that the different chloroauric acid concentrations in the ionic liquid resulted in the gold-silver composite particles having different particle sizes.

EXAMPLE 7

Isolation of Metal Nanoparticles

First, 5.0 mL methanol was added to 100 μL of the EMI-BF4 containing the gold nanoparticles prepared in Example 1. The resulting mixture was stirred. Centrifugation of the mixture with a centrifuge (Compact Tabletop Centrifuge 2420, manufactured by Kubota Corporation) at 4,000 rpm for 30 minutes resulted in the precipitation of the gold nanoparticles in the liquid phase.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The present application claims priority from Japanese Patent Application No. 2006-050942 filed on Feb. 27, 2006, the entire contents of which are incorporated herein by reference.

Industrial Applicability

The method for producing nanoparticles of the present invention is applied to the production of materials such as highly active photocatalysts, optoelectronic elements, and biomolecular markers.

The invention claimed is:

1. A method for producing nanoparticles, comprising attaching atoms or molecules from a nanoparticle precursor to an ionic liquid, without stirring, by evaporating the atoms or molecules from the nanoparticle precursor, thereby producing nanoparticles, the nanoparticles precursor being in the form of a solid.

2. The method for producing nanoparticles according to claim 1, wherein the atoms or molecules from the nanoparticle precursor are attached to the ionic liquid under reduced pressure.

3. The method for producing nanoparticles according to claim 1, wherein when nanoparticles having a particle size distribution of 3.0 to 8.0 nm are produced, a hydrophilic imidazolium compound is used as the ionic liquid.

4. The method for producing nanoparticles according to claim 3, wherein the hydrophilic imidazolium compound is 1-ethyl-3-methylimidazolium tetrafluoroborate or 1-butyl-3-methylimidazolium tetrafluoroborate.

5. The method for producing nanoparticles according to claim 1, wherein when nanoparticles having a particle size distribution of 1.0 to 4.0 nm are produced, a hydrophobic aliphatic compound is used as the ionic liquid.

6. The method for producing nanoparticles according to claim 5, wherein the hydrophobic aliphatic compound is N,N,N-trimethyl-N-propylammonium bis(trifluoromethanesulfonyl)imide.

7. The method for producing nanoparticles according to claim 1, wherein nanoparticles composed of two or more different elements are produced by using two or more nanoparticle precursors composed of different elements as the nanoparticle precursor.

8. The method for producing nanoparticles according to claim 1, wherein nanoparticles composed of two or more different elements are produced by adding a reactant to the ionic liquid, the reactant being composed of an element different from the atoms or molecules from the nanoparticle precursor and being capable of chemically reacting with the atoms or molecules from the nanoparticle precursor.

9. The method for producing nanoparticles according to claim 1, wherein the nanoparticle precursor is a metal or a semiconductor.

10. The method for producing nanoparticles according to claim 1, wherein the nanoparticle precursor is gold or silver.

11. The method for producing nanoparticles according to claim 1, wherein the nanoparticles have an average particle size of 1.5 to 6.0 nm.

* * * * *